United States Patent [19]

Grupp et al.

[11] Patent Number: 5,745,208
[45] Date of Patent: Apr. 28, 1998

[54] ELECTRICAL CELL OF THE TYPE COMPRISING TWO PLASTIC PARALLEL SUPPORT PLATES, SET APART FROM EACH OTHER, CARRYING ELECTRODES ON THEIR FACES

[75] Inventors: Joachim Grupp, Neuchâtel, Switzerland; Bernard Lemarié, Guilherand-Granges-les Valences, France

[73] Assignee: Asulab S.A., Bienne, Switzerland

[21] Appl. No.: 549,224

[22] Filed: Oct. 27, 1995

[30] Foreign Application Priority Data

Nov. 18, 1994 [FR] France ................... 94 13850

[51] Int. Cl.$^6$ ................................ G02F 1/1339
[52] U.S. Cl. ................................ 349/153
[58] Field of Search ................ 349/149, 152, 349/153

[56] References Cited

U.S. PATENT DOCUMENTS 4,457,589 7/1984 Tamura et al. .............. 350/336

FOREIGN PATENT DOCUMENTS 27 22 387  11/1977  Germany .

OTHER PUBLICATIONS

Patent Abstracts of Japan vol. 009 No. 044 (P-337), 23 Feb. 1985 & JP-A-59 184 326 (Citizen Tokei KK) 19, Oct. 1984.

*Primary Examiner*—William L. Sikes
*Assistant Examiner*—James A. Dudek
*Attorney, Agent, or Firm*—Griffin, Butler, Whisenhunt & Szipl

[57] ABSTRACT

In order to avoid any risk of detachment where conductors or current paths are provided through the sealing frame (7) which, with the support plates (1,2) defines a chamber (11) enclosed in a seal tight manner at the centre of the cell, the electrodes (3A, 4) situated inside this chamber are connected to respective electrical contacts (6) by means of strips of conductive adhesive (9) extending from the inside to the outside of the chamber. These strips of adhesive may also be used to connect two electrodes to each other.

13 Claims, 1 Drawing Sheet

ELECTRICAL CELL OF THE TYPE COMPRISING TWO PLASTIC PARALLEL SUPPORT PLATES, SET APART FROM EACH OTHER, CARRYING ELECTRODES ON THEIR FACES

The present invention relates to an electrical cell of the type comprising two parallel plastic support plates, set apart from each other, carrying electrodes on their opposite faces, these support plates enclosing between them a layer of sensitive material which can change its physical properties, in particular its optical properties, when a voltage is applied to the electrodes, or change its electrical properties when a stress is applied to the support plates or radiation passes through one of the latter, said sensitive material being protected from contact with the atmosphere by a sealing frame connecting, in a seal tight manner, the peripheral parts of the support plates, this sealing frame comprising electrical paths for electrically connecting the electrodes to the exterior.

Electrical cells of this type are used in particular for liquid crystal displays and for cells for producing energy from solar radiation.

In the case of a liquid crystal display cell, at least one of the support plates is formed of a transparent material, and at least one of the electrodes is also formed of a transparent substance, for example a tin oxide $SnO_2$, or a mixed indium and tin oxide known under the reference "ITO".

The fixing of the electrodes onto the plastic support plates is achieved in the following manner: the support is first selectively treated with corona effect or suchlike, to prepare its surface for the subsequent operations, then a primer is placed or created on the prepared surface, for example a layer of $SiO_2$ or $Al_2O_3$, and the electrode substance is deposited, notably the transparent electrode substance, onto this primer. These operations are carried out at a low temperature, in order to reduce thermo-mechanical stress in the materials, which avoids mediocre adhesion.

According to conventional techniques, the electrodes of the cell extend to the edge of one of the support plates, to form connection contacts with the exterior, while the sealing frame, formed of a curable adhesive, does not extend as far as the edge of the support plate, so as to leave the connection contacts free, and the extension of the electrode thus passes across said frame.

It has been observed that, when tests comprising thermal cycling are conducted, a detachment of the substrate in the area around the passage of the electrode pattern under the sealing frame frequently appears. This detachment leads to irreparable damage to the cell.

An aim of the present invention is to overcome this disadvantage and to provide an electrical cell of the type previously mentioned, in which the risk of damage from thermal cycling is considerably reduced or eliminated.

In order to obtain this result, the invention provides that the electrodes situated inside the sealing frame do not pass under the latter, but are electrically connected to contacts situated outside this frame by means of strips of electrically conductive adhesive which are fixed to both a support plate and to a sealing frame.

The invention arises from a hypothesis of the inventors, that the detachment observed results from significant stresses appearing at the interfaces between the substrate and the electrode and between the electrode and the sealing frame, resulting from differences in thermal expansion coefficient between the inorganic and organic materials present at these interfaces.

The results obtained from the invention confirm the validity of the hypothesis.

In an advantageous manner, the electrically conductive adhesive is formed of a curable adhesive containing a suitable quantity of metallic particles. The metallic particles are preferably silver particles.

In accordance with an advantageous embodiment, a strip of conductive adhesive is sufficiently thick to extend from one support plate to the other, the sealing frame itself being interrupted at this strip, and its adjacent parts being connected in a seal tight manner to said strip. In this case, the realisation of the electrical path requires relatively little caution, and, in the event that the two electrodes need to be connected to each other, the same electrical path enables the connection to be achieved at the same time.

If the electrodes do not need to be connected to each other, one may prefer to provide a strip of conductive adhesive of insufficient thickness to extend from one support plate to the other, and no interruption in the actual sealing frame at said strip.

The invention will now be described in more detail with the aid of a practical example illustrated by the drawings, in which.

Figure 1:
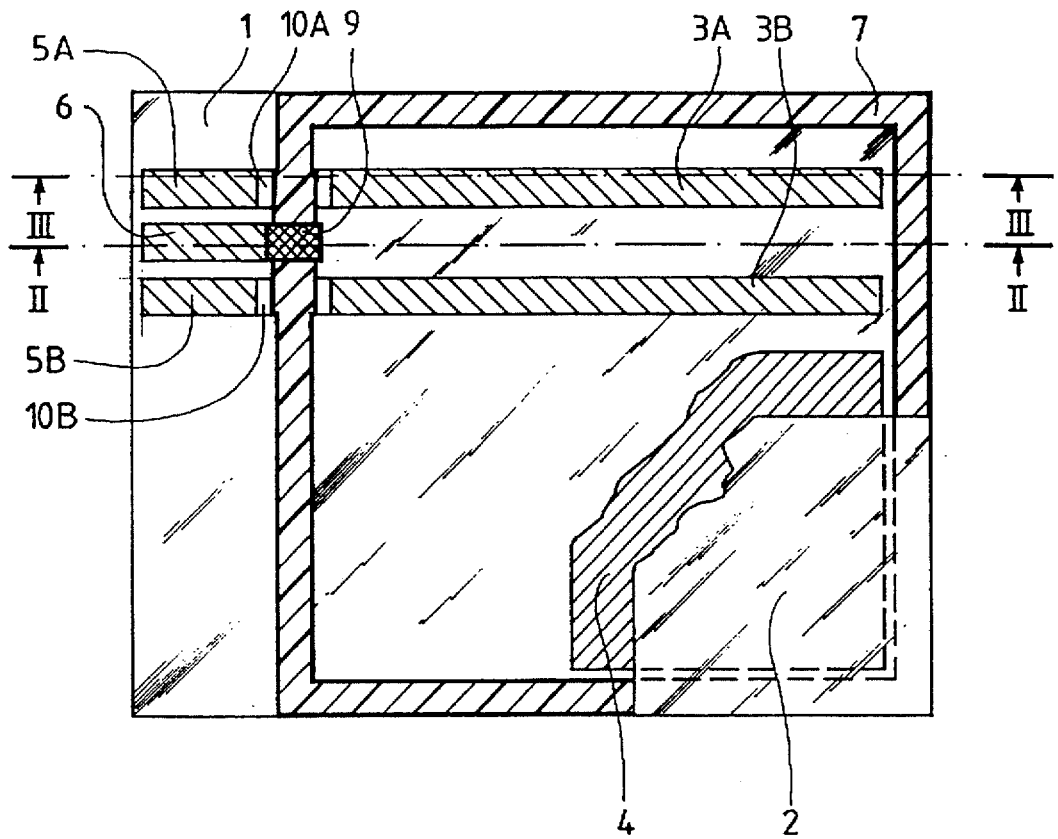
FIG. 1 is a partially cut away cross-sectional plane view of an electrical cell according to the invention.
Figure 2:
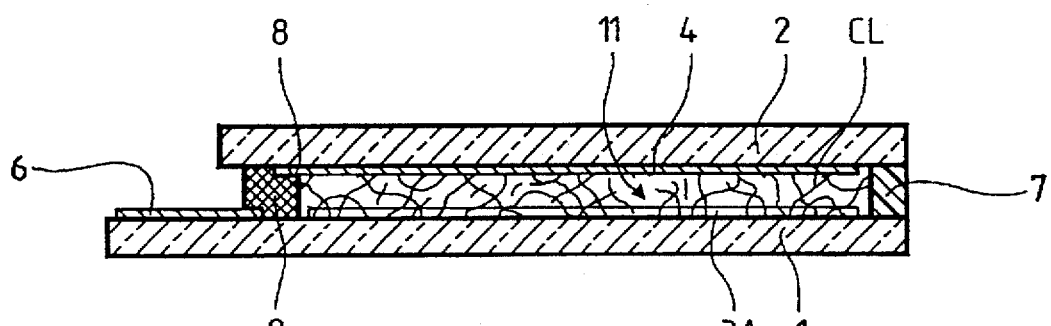
FIG. 2 is a cross-sectional view along the line II—II of FIG. 1.
Figure 3:
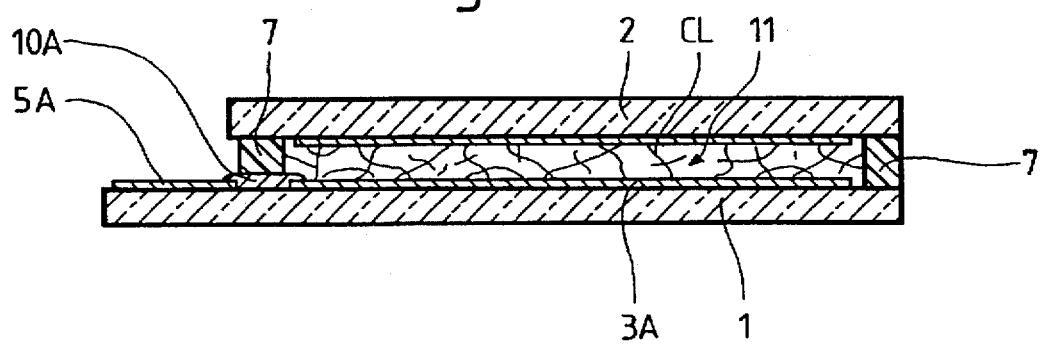
FIG. 3 is a cross-sectional view along the line III—III of FIG. 1.

FIGS. 1 to 3 show a liquid crystal display cell formed of a lower support plate 1 and an upper support plate 2, both in transparent plastic material, the upper support plate being partially cut away in FIG. 1. Support plate carries a plurality of lower electrodes 3A, 3B etc., in accordance with a predetermined configuration, in this case in lines. These electrodes are made of transparent conductive material of the "ITO" (indium and Tin oxide) type. Support plate 2 carries, on its lower face, for example a single electrode 4 of the same type as electrodes 3 covering almost the entire surface of the lower face of upper support plate 2. It has been assumed, for the sake of simplification, that electrodes 3A, 3B, etc., and 4 are respectively connected to external contacts 5A, 5B, etc., and 6. Other contacts, required for the operation of the cell, have not been shown. In FIG. 1, contacts 5A and 5B only are shown respectively connected to lower electrodes 3A and 3B, and contact 6, which is connected to upper electrode 4 and insulated from lower electrodes 3A, 3B, etc., above which this upper electrode 4 extends, see FIG. 2. Of course, other configurations of electrodes are possible.

A sealing frame 7, formed with the aid of a curable adhesive, has a substantially closed contour along the edge of upper support plate 2. The lower support plate is a little larger, and carries contacts 5A, 5B, etc. and 6 on the shelf. Sealing frame 7 is connected in a seal tight manner to support plates 1 and 2.

FIG. 2 is a cross-section along a plane which does not pass through any of lower electrodes 3A, 3B etc. It can be seen that lower and upper electrodes 3A, 3B etc., and 4 do not extend as far as the edge of corresponding support plates 1 and 2, but that upper electrode 4 includes at its periphery a contact lug 8 which extends further towards the exterior, than lower electrodes 3A, 3B etc. A quantity of conductive adhesive 9, formed in practice by pressing, between support plates 1 and 2, a drop of adhesive for example an adhesive sold under the commercial name of "EPOTEC H 20 F", formed of an organic resin adhesive containing around 10% silver in volume, comes into contact on the one hand with upper electrode 4, and on the other hand with contact 6, but does not reach lower electrodes 3A, 3B (FIG. 1). It will be noted in this regard that in order to ensure a good electrical contact of lug 8 and contact 6 with adhesive material 9, care should be taken to ensure that adhesive material 9 substantially covers lug 8 as well as contact 6.

In other words, the sealing frame includes two materials, which are respectively electrically insulating and electrically conductive, the part of the sealing frame in electrically conductive material extending from the exterior towards the inside of the sealing frame, the electrodes being in contact only with the part of the sealing frame made of electrically conductive material.

FIG. 3 is a cross-section along a plane which passes through lower electrode 3A. In this plane, upper electrode 4 does not extends as far towards the exterior than lower electrode 3A. The latter reaches a conductive adhesive mass 10A similar to adhesive mass 9 mentioned above, and is thus electrically connected to external contact 5A, but isolated from upper electrode 4.

It will be noted that in FIG. 2, adhesive mass 9 has been shown in seal tight contact with lug 8 on one side, and with lower support plate 1 on the other side. Sealing frame 7 is thus interrupted by adhesive mass 9. In FIG. 3, it has been shown that sealing frame 7 is merely thinner where the adhesive mass 10A is disposed, said adhesive mass in seal tight contact with the thinner part of frame 7 and with support plate 1.

Other arrangements are possible, provided that adhesive mass 9, 10A, 10B cooperate with frame 7 to complete the insulation of the internal chamber defined between support plates 1 and 2. This internal chamber could be filled with a liquid crystal material CL for example or with a photoelectrical material.

What is claimed is:

1. An electrical cell of the type comprising two parallel plastic support plates, set apart from each other, carrying electrodes on their opposite faces, the support plates enclosing between them a layer of sensitive material which can change its physical properties when voltage is applied to the electrodes, said sensitive material being protected from contact with the atmosphere by a sealing frame connecting, in a seal tight manner, peripheral parts of the support plates, the sealing frame comprising electrical paths for electrically connecting the electrodes to the exterior, wherein the electrodes situated inside the sealing frame do not pass through the latter, but are electrically connected to contacts situated outside said frame by means of strips of electrically conductive adhesive fixed to at least one support plate and to the sealing frame, said electrically conductive adhesive extending from the interior towards the exterior of the sealing frame and over the entire width of the latter.

2. A cell according to claim 1, wherein the electrically conductive adhesive comprises a curable adhesive containing a suitable quantity of metallic particles.

3. A cell according to claim 2, wherein said metallic particles are silver particles.

4. A cell according to claim 1, wherein one strip of conductive adhesive is sufficiently thick to extend from one support plate to the other, the sealing frame itself being interrupted at this strip, and adjacent parts of the sealing frame being connected in a seal tight manner to said strip.

5. An electrical cell as claimed in claim 1 wherein said sensitive material is a material which can change its optical properties when voltage is applied to the electrodes.

6. An electrical cell of the type comprising two parallel plastic support plates, set apart from each other, carrying electrodes on their opposite faces, the support plates enclosing between them a layer of sensitive material which can change its physical properties, in particular its optical properties, when voltage is applied to the electrodes, or change its electrical properties when a stress is applied to the support plates or radiation passes through one of the latter, said sensitive material being protected from contact with the atmosphere by a sealing frame connecting, in a seal tight manner, the peripheral parts of the support plates, the sealing frame comprising electrical paths for electrically connecting the electrodes to the exterior, wherein the electrodes situated inside the sealing frame do not pass through the latter, but are electrically connected to contacts situated outside said frame by means of strips of electrically conductive adhesive fixed to at least one support plate and to the sealing frame, and wherein one strip of conductive adhesive is of insufficient thickness to extend from one support plate to the other, and the sealing frame itself is not interrupted at said strip.

7. An electrical cell of the type comprising two parallel plastic support plates, set apart from each other, carrying electrodes on their opposite faces, the support plates enclosing between them a layer of sensitive material which can change its electrical properties, said sensitive material being protected from contact with the atmosphere by a sealing frame connecting, in a seal tight manner, the peripheral parts of the support plates, the sealing frame comprising electrical paths for electrically connecting the electrodes to the exterior, wherein the electrodes situated inside the sealing frame do not pass through the latter, but are electrically connected to contacts situated outside said frame by means of strips of electrically conductive adhesive fixed to at least one support plate and to the sealing frame, said electrically conductive adhesive extending from the interior towards the exterior of the sealing frame and over the entire width of the latter.

8. An electrical cell as claimed in claim 7 wherein said sensitive material is a material which changes its electrical properties when a stress is applied to the support plates.

9. An electrical cell as claimed in claim 7 wherein said sensitive material is a material which changes its electrical properties when radiation passes through one of the support plates.

10. A cell according to claim 7, wherein the electrically conductive adhesive comprises a curable adhesive containing metallic particles.

11. A cell according to claim 10, wherein the metallic particles are silver particles.

12. A cell according to claim 7, wherein one strip of conductive adhesive is sufficiently thick to extend from one support plate to the other, the sealing frame itself being interrupted at this strip, and adjacent parts of the sealing frame being connected in a seal tight manner to said strip.

13. A cell according to claim 7, wherein one strip of conductive adhesive is of insufficient thickness to extend from one support plate to the other, and the sealing frame itself is not interrupted at said strip.

* * * * *